(12) United States Patent
Hartman

(10) Patent No.: US 8,646,187 B2
(45) Date of Patent: Feb. 11, 2014

(54) AMMUNITION MEASUREMENT TOOL

(75) Inventor: Rodney P. Hartman, Lanark, IL (US)

(73) Assignee: Forster Products, Inc., Lanark, IL (US)

( * ) Notice: Subject to any disclaimer, the term of this patent is extended or adjusted under 35 U.S.C. 154(b) by 193 days.

(21) Appl. No.: 13/408,125

(22) Filed: Feb. 29, 2012

(65) Prior Publication Data

US 2013/0219728 A1  Aug. 29, 2013

(51) Int. Cl.
*G01B 5/08* (2006.01)

(52) U.S. Cl.
USPC .......................................... 33/506; 33/555.2

(58) Field of Classification Search
USPC .................... 33/501.05, 555.1, 555.2, 506
See application file for complete search history.

(56) References Cited

U.S. PATENT DOCUMENTS

| | | | |
|---|---|---|---|
| 1,881,651 A * | 10/1932 | Judge | 33/555.2 |
| 2,117,317 A * | 5/1938 | Hakenjos et al. | 33/506 |
| 2,521,087 A * | 9/1950 | Paulus | 33/506 |
| 4,107,850 A * | 8/1978 | Adler | 33/555.2 |
| 4,918,825 A * | 4/1990 | Lesh et al. | 33/506 |
| D364,176 S * | 11/1995 | Hartman | D15/136 |
| 5,617,644 A * | 4/1997 | Bonelli | 33/555.2 |
| 2006/0248739 A1* | 11/2006 | Cauley | 33/506 |
| 2010/0288833 A1* | 11/2010 | Santos et al. | 33/555.2 |

* cited by examiner

*Primary Examiner* — G. Bradley Bennett
(74) *Attorney, Agent, or Firm* — Bennet K. Langlotz; Langlotz Patent & Trademark Works, Inc.

(57) ABSTRACT

Ammunition measurement tools include a frame having a reference surface adapted to contact a first caliper jaw of a pair of calipers, a gauge element attached to the frame and movable, the gauge element defining a plurality of apertures of different selected diameters, each aperture diameter corresponding to a diameter of a selected part of a cartridge, the gauge element being operable to move to position a selected aperture in registration with a second jaw of the pair of calipers such that the distance from the aperture to the second jaw may be measured to determine a length dimension of a cartridge positioned in the aperture. The gauge element may be rotatably connected to the frame to rotate about an axis. The frame may include an attachment facility operable to secure to the jaw of a pair of calipers.

20 Claims, 3 Drawing Sheets

AMMUNITION MEASUREMENT TOOL

FIELD OF THE INVENTION

The present invention relates to firearms, and more particularly to an ammunition measurement tool for use with calipers.

BACKGROUND OF THE INVENTION

Although most new shooters begin with factory ammunition, there are multiple advantages that encourage many to pursue "reloading." Reloading is the reprocessing or recycling of previously fired cartridge cases into loaded ammunition. The advantages of reloading include reducing the cost of ammunition, being able to custom tune ammunition, enabling a firearm to be more versatile through use of a broader assortment of bullet styles, and enabling owners of obsolete firearms to continue to shoot even when factory ammunition is no longer available. Other advantages include affordability, and the ability to manufacture unusually precise ammunition for enhanced accuracy.

Modern rifle and handgun cartridges consist of the cartridge case, the primer, the propellant, and the bullet. The most costly and critical component of a cartridge is the case. In addition to holding all of the other components, the case provides a precision seal to ensure the high-pressure expanding gases remain in the firearm, and away from the shooter, to efficiently push the bullet out of the barrel. The brass case is the costliest component of the cartridge, accounting for at least 65% of the cost. Reusing empty factory ammunition cases can greatly reduce the cost per shot since cases can be reused several times before they wear out.

However, a fired case requires that several operations be performed to restore it to a condition suitable for firing. A reloader has control over these processes, but also must be careful to ensure that the resulting cartridge has the proper dimensions to fit the firearm's chamber.

A measurement that is of particular concern is the cartridge's headspace dimension or measurement. Headspace is defined as the length of a cartridge or case as measured from the rear face, or head, to a point of selected intermediate diameter on the tapered shoulder. Headspace is associated with the linear, or front to rear, play of a cartridge in the chamber when the action is closed. If the headspace is too small, the action will not close. If there is too much headspace, the rear of the cartridge is unsupported. When the case expands upon firing, a too-short case can stretch atypical amounts and even rupture as the case's shoulder is blown forward. If the reloader resizes the case excessively and sets the shoulder back too far, the excess headspace condition is created again. Eventually, the stretched brass will succumb to fatigue and crack and break.

However, even cartridges fired in firearms under the correct headspace conditions undergo dimensional changes that must be corrected during the reloading process. Resizing returns the case to the proper dimensions to ensure reliable functioning and assures the case neck grips the bullet tightly. A reloading press is used to recondition the cartridge case using a reloading die and a shell holder.

Various approaches to measuring cartridge headspace are known. However, every type of cartridge requires the use of a separate measurement gauge because the reference diameter at the shoulder differs among cartridge sizes. Another approach involves the attachment of one of five interchangeable bushings to a pair of calipers in order to measure the length of the case from the case-add to the datum line on the case shoulder. Bushings must be changed depending upon the type of case to be measured.

Therefore, a need exists for a new and improved ammunition measurement tool that allows multiple cartridge sizes to be tested with one tool without removing the tool from the calipers. In this regard, the various embodiments of the present invention substantially fulfill at least some of these needs. In this respect, the ammunition measurement tool according to the present invention substantially departs from the conventional concepts and designs of the prior art, and in doing so provides an apparatus primarily developed for the purpose of multiple cartridge sizes to be tested with one tool without removing the tool from the calipers.

SUMMARY OF THE INVENTION

The present invention provides an improved ammunition measurement tool, and overcomes the above-mentioned disadvantages and drawbacks of the prior art. As such, the general purpose of the present invention, which will be described subsequently in greater detail, is to provide an improved ammunition measurement tool that has all the advantages of the prior art mentioned above.

To attain this, the preferred embodiment of the present invention essentially comprises a frame having a reference surface adapted to contact a first caliper jaw of a pair of calipers, a gauge element attached to the frame and movable, the gauge element defining a plurality of apertures of different selected diameters, each aperture diameter corresponding to a diameter of a selected part of a cartridge, the gauge element being operable to move to position a selected aperture in registration with a second jaw of the pair of calipers such that the distance from the aperture to the second jaw may be measured to determine a length dimension of a cartridge positioned in the aperture. The gauge element may be rotatably connected to the frame to rotate about an axis. The frame may include an attachment facility operable to secure to the jaw of a pair of calipers. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
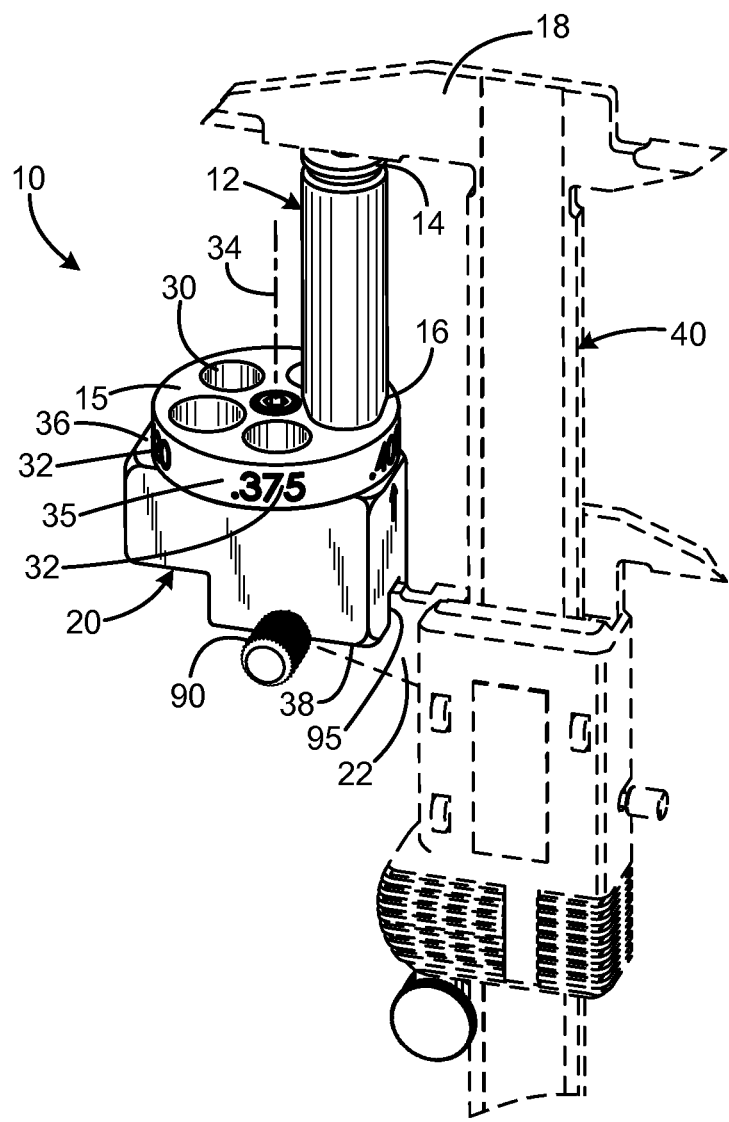
FIG. 1 is a top isometric view of the current embodiment of the ammunition measurement tool constructed in accordance with the principles of the present invention enclosed by calipers.

An embodiment of the ammunition measurement tool of the present invention is shown and generally designated by the reference numeral 10.

Figure 2:
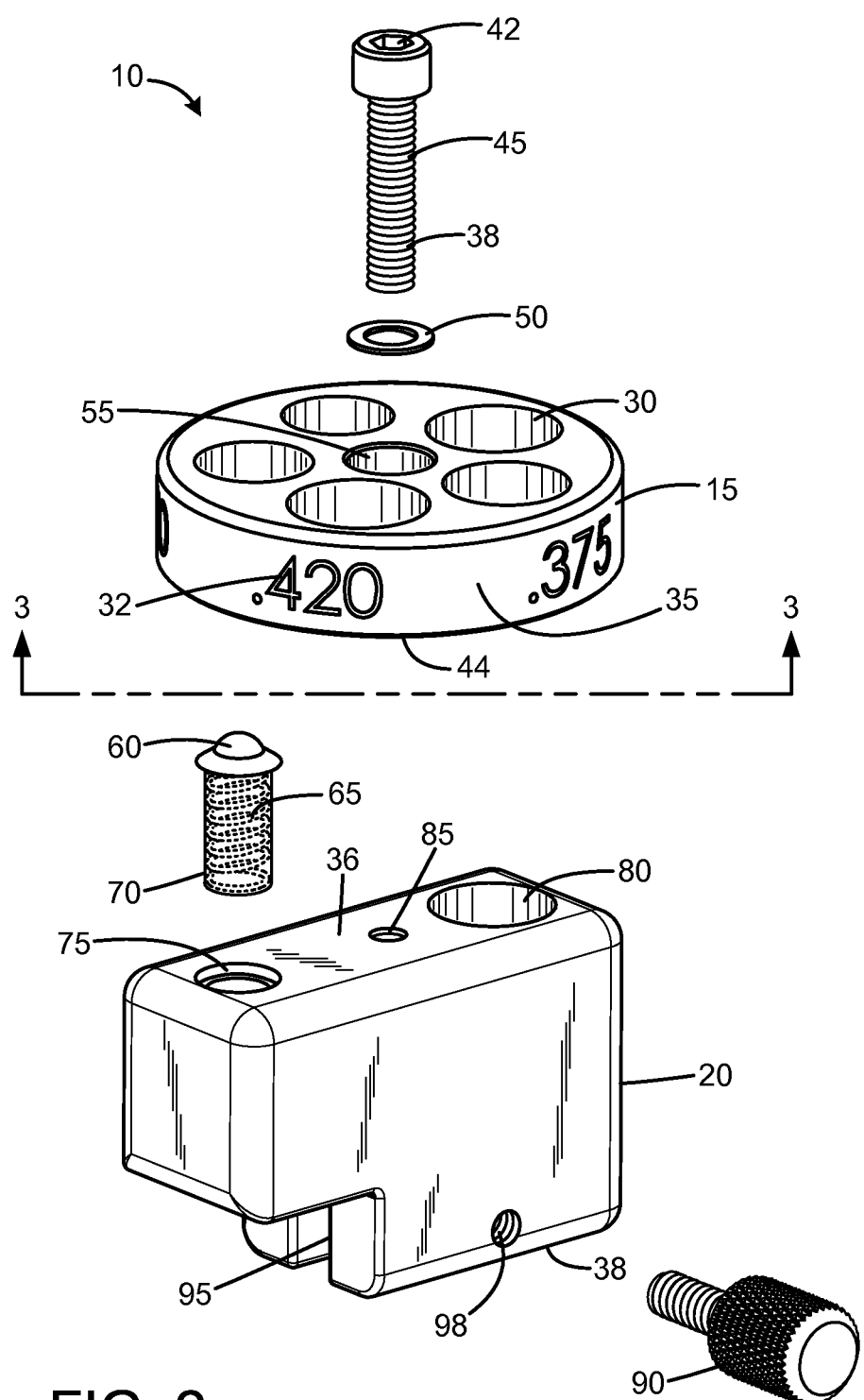
FIG. 2 is a top isometric exploded view of the current embodiment of the ammunition measurement tool of FIG. 1.

FIGS. 1 & 2 illustrate the improved ammunition measurement tool 10 of the present invention. More particularly, the ammunition measurement tool has a cylindrical dial case or rotor gauge element 15 that is attached to a fixed body or frame 20. The cylindrical dial case rotates about a central axis 34. The cylindrical dial case has multiple elongated milled apertures 30 of various diameters located circumferentially. The diameters are determined by the shoulder diameters of the datum diameter of cartridge to be used with aperture. Each aperture is identified by an indicium 32 that indicates the datum diameter of cartridge to be used with that aperture. The indicia 32 are displayed on a cylindrical surface 35 of the cylindrical dial case. In the current embodiment, each aperture is centered at a common radius from the central axis. However, alternative positions of the apertures are also possible. In the current embodiment, there are five apertures; the apertures are associated with the following calibers and have the following dimensions:

TABLE 1

Aperture/Datum Diameters for Common Case Calibers

| Aperture Number | Aperture Diameter | Datum Diameter | Common Case Caliber | |
|---|---|---|---|---|
| 1 | .330" | .330" | 17 Rem. | 223 Rem. |
|   |       |       | 204 Ruger | 220 Swift |
|   |       |       | 222 Rem. | 221 Fireball |
|   |       |       | 222 Rem. Mag. | 6 mm × 45 |
| 2 | .350" | .350" | 22 Rem. BR | 6 mm Rem. BR |
|   |       |       | 22 PPC/Sako Usa | 6 mm PCC/Sako Usa |
|   |       |       | 22 PPC/Wildcat Russian | 6 mm PPC/Wildcat Russian |
|   |       |       | 225 Win. | 6.5 mm GRENDEL |
| 3 | .375" | .375" | 6 mm Rem. (224) | 303 British |
|   |       |       | 25-06 Rem. | 30-06 Spring |
|   |       |       | 6.5 × 57 Mauser | 32 Win. Spec. |
|   |       |       | 270 Win. | 6.5 × 284 Win. |
|   |       |       | 7 × 57 Mauser | 6 mm Dasher |
|   |       |       | 280 Rem (7 mm Exp.) | 6 × 47 Lapua |
|   |       |       | 284 Win. | 6.5 × 47 Lapua |
|   |       |       | 30-30 Win. | 6 mm XC |
|   |       |       | 30-40 Krag |  |
| 4 | .400" | .400" | 243 Win. | 308 Win. |
|   |       |       | 7 mm-08 Rem. | 308 National Match |
| 5 | .420" | .420" | 264 Win. | 358 Win. |
|   |       |       | 7 mm Rem. Mag. | 375 H&H |
|   |       |       | 300 Win. Mag. | 7 mm STW |
|   |       |       | 30-338 Win. Mag. | 300 Ultra Mag. |
|   |       |       | 8 mm Rem. Mag. | 7 mm Rem. Ultra Mag. |

Table 1 should be viewed as only a partial representative sample of cartridges/calibers associated with the datum dial apertures. The cylindrical dial case 15 may have the diameters of the apertures 30 selected to correspond to selected diameters associated with any portion of a cartridge, including bullets, so that bullet seating and an overall cartridge length may be determined by interaction of the aperture with a meplat or conical surface of a bullet. In alternative embodiments, the datum dial may be exchanged for a bullet dial so that bullets or completed cartridges can be checked to determine bullet consistency and also bullet seating depth out to a point along the ogive. In the case of a bullet dial, the datum dial apertures may be replaced by conical depressions that receive the tip of pointed bullets to determine bullet seating and the overall cartridge length.

The cylindrical dial case 15 has a central bore 55 that receives a head cap screw 45 having a socket 42 at one end and a washer 50 for attachment to the body 20. The top 36 of the body 20 has a mating hole 85 that receives the threaded portion 38 of the head cap screw. The head cap screw secures the cylindrical dial case to the body, but permits the cylindrical dial case to rotate freely.

The body 20 additionally includes an elongated bore 80 for receiving the front 16 portion of a cartridge 12 inserted into an axially aligned aperture 30. The body also includes a milled aperture 75 that receives a spring detent mechanism that consists of a casing 70, a spring 65, and a ball detent 60. The bottom 38 of the body defines an open elongated slot 95 that receives the lower jaw 22 of a pair of calipers 40 while the ammunition measurement tool 10 is in use. The body is releasably secured to the lower jaw by an attachment facility consisting of a brass screw 90 threaded into the body through a mating screw hole 98.

In FIG. 1, the ammunition measurement tool 10 is depicted in use with the front or shoulder 16 of a cartridge 12 inserted into the appropriately sized aperture 30. The cartridge consists of the cartridge case, the primer, the propellant, and the bullet. The ammunition measurement tool and the rear or head 14 of the cartridge are clasped between the upper jaw 18 and the lower jaw 22 of the pair of calipers 40. The aperture is sized to hold the cartridge so the exposed length of the cartridge plus the width of the ammunition measurement tool as engaged by the lower jaw of the pair of calipers provides an accurate measure of the cartridge headspace.

Headspace is measured differently depending on whether the firearm's caliber uses rimmed, belted, or rimless cartridges. Headspace for rimmed and belted cartridges is the distance between the bolt face and the top of the rim, which is the chamber face when the bolt is closed. For rimless cartridges, headspace is the distance between the bolt face and a datum line as determined by SAAMI (Sporting Arms and Ammunition Manufacturers Institute), which is located at the front of the cartridge where the cartridge rests on its shoulders when bolt is closed.

Figure 3:
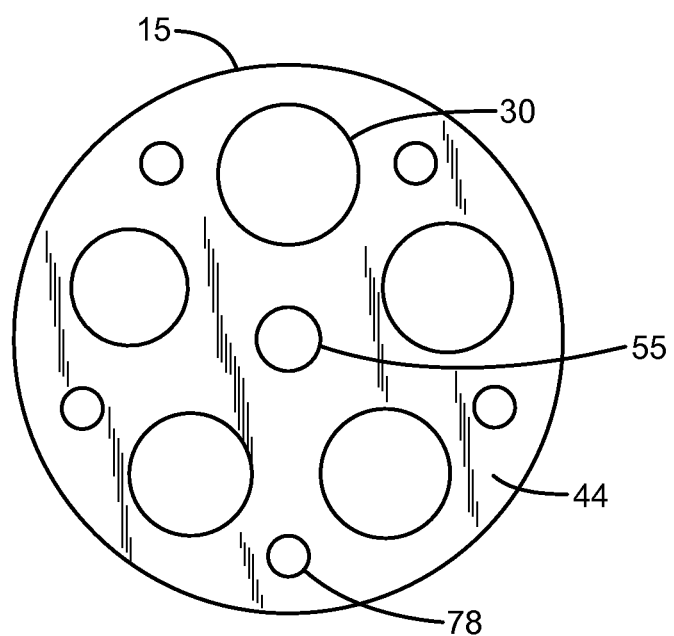
FIG. 3 is a bottom view of the current embodiment of the cylindrical dial case of the present invention removed from the ammunition measurement tool of FIG. 1.

FIG. 3 illustrates the improved cylindrical dial case 15. More particularly, the bottom 44 of the cylindrical dial case has detent holes 78 disposed circumferentially. The detent holes are positioned to receive the ball detent 60 when a corresponding aperture 30 is axially registered with the elongated bore 80. The engagement of the ball detent with a detent hole releasably maintains the cylindrical dial case in the selected position. The apertures 30 are chamfered at the bottom.

While a current embodiment of a firearm with movable cheek riser has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ammunition measurement tool for use with calipers having a first and second jaw, the tool comprising:

a frame having a reference surface adapted to contact a first caliper jaw of a pair of calipers;

a gauge element attached to the frame and movable among a plurality of positions;

the gauge element defining a plurality of apertures of different selected diameters;

each aperture diameter corresponding to a diameter of a selected part of a cartridge;

the gauge element being operable to move to position a selected aperture in registration with a second jaw of the pair of calipers such that the distance from the aperture to the second jaw may be measured to determine a length dimension of a cartridge positioned in the aperture.

2. The tool of claim 1 wherein the selected part of a cartridge is a cartridge shoulder.

3. The tool of claim 1 wherein the gauge element is rotatably connected to the frame to rotate about an axis.

4. The tool of claim 3 wherein the apertures are each centered at a common radius from the axis.

5. The tool of claim 1 wherein the frame including an attachment facility operable to secure to the jaw of a pair of calipers.

6. The tool of claim 1 further including a detent facility operable to maintain any selected aperture in a common measurement position.

7. The tool of claim 6 wherein the measurement position is registered with the reference surface.

8. The tool of claim 1 wherein the reference surface is positioned within a channel adapted to receive the first jaw.

9. An ammunition measurement tool comprising:

a frame having a measurement surface;

a rotor defining an axis rotatably mounted to the frame to rotate about the axis;

the rotor defining a plurality of apertures of different selected sizes;

the apertures being distributed about the axis, such the rotor operates to rotate a selected aperture into a measurement position registered with the reference surface, whereby a cartridge with a selected portion received by the selected aperture may be measured by a pair of calipers having jaws contacting the reference surface and the head of the case.

10. The tool of claim 9 wherein the selected portion of a cartridge is a cartridge case neck.

11. The tool of claim 9 wherein the reference surface is perpendicular to the axis.

12. The tool of claim 9 wherein the apertures are each centered at a common radius from the axis.

13. The tool of claim 9 wherein the frame including an attachment facility operable to secure to the jaw of a pair of calipers.

14. The tool of claim 9 further including a detent facility operable to maintain any selected aperture in a common measurement position.

15. The tool of claim 14 wherein the measurement position is registered with the reference surface.

16. The tool of claim 9 wherein the reference surface is positioned within a channel adapted to receive the first jaw.

17. An ammunition measurement tool for use with calipers having a first and second jaw, the tool comprising:

a frame having a reference surface adapted to contact a first caliper jaw of a pair of calipers;

a gauge element attached to the frame and movable among a plurality of positions;

the gauge element defining a plurality of apertures of different selected diameters;

each aperture diameter corresponding to a diameter of a selected part of a cartridge case;

the gauge element being operable to move to position a selected aperture in registration with a second jaw of the pair of calipers such that the distance from the aperture to the second jaw may be measured to determine a length dimension of a cartridge positioned in the aperture.

18. The tool of claim 17 wherein the gauge element is rotatably connected to the frame to rotate about an axis.

19. The tool of claim 17 wherein the frame including an attachment facility operable to secure to the jaw of a pair of calipers.

20. The tool of claim 17 further including a detent facility operable to maintain any selected aperture in a common measurement position.

\* \* \* \* \*